United States Patent Office.

WILLIAM W. AVERELL, OF BATH, NEW YORK, ASSIGNEE OF LOUIS LA BRECHE-VIGER.

*Letters Patent No.* 95,358, *dated September* 28, 1869; *reissue No.* 3,835, *dated February* 15, 1870.

IMPROVEMENT IN THE MANUFACTURE OF CAST-STEEL.

The Schedule referred to in these Letters Patent and making part of the same.

*To all whom it may concern:*

Be it known that LOUIS LA BRECHE-VIGER, of Montreal, in the Province of Quebec, Dominion of Canada, has invented a new Mode of Making and Manufacturing Cast-Steel at one operation by the use and admixture, first, of plumbago with pulverized iron ores, and also with what is called iron sand ore with wrought iron, iron scraps, iron shavings, iron chips, and with what is usually styled iron or steel sponge, either in clay or other non-fusible pots or crucibles, or in a reverberatory or other suitable furnace; second, of compressed powdered charcoal, anthracite, coke, or other equivalent carbon, with the aforesaid pulverized iron ore, iron sand, wrought iron, iron shavings, scraps, chips, or sponge, in a reverberatory or other suitable furnace, as follows:

The ore should be pure and as free as possible from earthy matters, finely pulverized, when other ore than the sand ore is used, and the ore so prepared or the iron-sand ore, wrought iron, or iron scraps, shavings chips, or sponge aforesaid, should be mixed with the pulverized plumbago or charcoal, or the other carbons.

The proportion of the plumbago or charcoal or other carbons used should vary from one to thirty-five per cent, in weight of the ore, according to the nature of the substance to be deoxidized and carbonized, and according to the quantity of steel intended to be produced, and according to the purity of the plumbago itself.

Oxide of manganese may be used as in the ordinary process of cast-steel making, with blister steel or wrought iron. This mixture is compressed or not, at will. If plumbago forms part of the mixture, this mixture is then treated in a clay or other non-fusible pot in the same manner as the melting of blister-steel, or it is treated in a reverberatory or other suitable furnace, in the manner hereinafter described.

If charcoal is used the mixture is placed in a reverberatory or other suitable furnace constructed so as to allow the metal to be drawn after fusion. It is then covered with a flux of glass or blast-furnace cinders, or with glass-making materials, or with thin slabs of soapstone or steatite, or with those substances combined, or with other protecting materials, and then heated until reduction and fusion take place, the metal being protected against oxidation by the aforesaid covering. If the process be conducted in a furnace in which the mass is simply heated, no covering will be required; the object of the covering being to shield the mass from oxidation or other injurious chemical action.

It is best to use plumbago in the process described under my first head, but anthracite being similar in composition, and in some of its physical characteristics, may be substituted wholly or in part for plumbago.

The use of powdered charcoal as a reducing and carbonizing agent in principle is not claimed.

What is claimed as peculiarly the invention of LOUIS LA BRECHE-VIGER, is—

1. The use of the admixture of pulverized plumbago compressed or not with iron ores, iron sand, or iron, to make cast-steel in one operation.

2. The use of the admixture of pulverized anthracite coal compressed or not with iron ores, iron sand, or iron, to make cast-steel in one operation.

3. The use of the admixture of pulverized coke compressed or not with iron ores, iron sand, or iron, to make cast-steel in one operation.

4. The use of the admixture of pulverized plumbago pulverized anthracite coal, pulverized coke compressed or not with iron ores, iron sand, wrought iron, iron scraps, shavings, chips, and sponge, in a crucible or in a reverberatory or reheating, or puddling, or air-fur-furnace, or in what is called and known as a Siemen's furnace, to make cast-steel in one operation; the said mixture if used in a furnace to be covered or not with a flux of glass, or blast-furnace or other furnace cinders, or with glass-making materials, or with slabs of soapstone or with tiles or fire-bricks, or if the ore or carbon used contain earthy matters the slags or scoriæ which they will furnish may render other covering unnecessary.

5. The use of the admixture of powdered charcoal compressed with pulverized iron ores, or iron sand, or iron sponge, in a crucible to make cast-steel in one operation.

6. The use of the admixture of pulverized charcoal compressed or not with iron ores or iron sand, in any of the furnaces, and with or without the covering mentioned in number four of this claim, to make cast-steel in one operation.

7. The use of the above admixtures in the following proportions, viz: from one to thirty-five per cent. of the said carbons in weight of the ore or iron, according to the purity of the ores and of the carbon used, and according to the quality of the steel to be produced.

WM. W. AVERELL.
*Assignee of* LOUIS LA BRECHE-VIGER.

Witnesses:
R. G. RIEMAN,
W. LEE, Jr.